US005685052A

United States Patent [19]

Meyers et al.

[11] Patent Number: 5,685,052

[45] Date of Patent: Nov. 11, 1997

[54] GRAPHITIC PACKING REMOVAL TOOL

[75] Inventors: Kurt Edward Meyers, Avella; George J. Kolsun, Pittsburgh, both of Pa.

[73] Assignee: The United States of America as represented by the Department of Energy, Washington, D.C.

[21] Appl. No.: 635,426

[22] Filed: Apr. 11, 1996

[51] Int. Cl.$^6$ .......... B23P 19/02

[52] U.S. Cl. .......... 29/235; 29/280; 29/282

[58] Field of Search .......... 29/235, 270, 426.5, 29/258, 262, 280, 282

[56] References Cited

U.S. PATENT DOCUMENTS

| | | | |
|---|---|---|---|
| 2,614,318 | 10/1952 | McCord | 29/263 |
| 2,697,870 | 12/1954 | Zucker | 29/222 |
| 2,849,906 | 1/1958 | Loveless | 81/3 |
| 2,992,848 | 7/1961 | Livensparger | 29/270 |
| 3,074,156 | 1/1963 | Hinrichsen et al. | 29/262 |
| 3,336,652 | 8/1967 | Ullmo | 29/262 |
| 3,571,886 | 3/1971 | Corsmeier | 29/270 |
| 4,330,917 | 5/1982 | Dzurkovich | 29/235 |
| 4,335,449 | 6/1982 | Edwards et al. | 29/426.5 |
| 4,649,618 | 3/1987 | Harrison | 29/426.5 |
| 4,944,081 | 7/1990 | Ross | 29/235 |
| 5,075,945 | 12/1991 | Krzecki | 29/235 |
| 5,091,142 | 2/1992 | Petit | 376/261 |

*Primary Examiner*—Timothy V. Eley
*Assistant Examiner*—Lee Wilson
*Attorney, Agent, or Firm*—Virginia B. Caress; William R. Moser; Paul A. Gottlieb

[57] ABSTRACT

Graphitic packing removal tools for removal of the seal rings in one piece. The packing removal tool has a cylindrical base ring the same size as the packing ring with a surface finish, perforations, knurling or threads for adhesion to the seal ring. Elongated leg shanks are mounted axially along the circumferential center. A slit or slits permit insertion around shafts. A removal tool follower stabilizes the upper portion of the legs to allow a spanner wrench to be used for insertion and removal.

11 Claims, 2 Drawing Sheets

GRAPHITIC PACKING REMOVAL TOOL

FIELD OF THE INVENTION

The present invention relates to packing removal tools for removing the packing from valves and pumps. In particular, the present invention is directed to packing removal tools for the fast, efficient removal of graphitic packing.

BACKGROUND OF THE INVENTION

This invention was developed pursuant to a United States Department of The Navy Contract.

Packings are used in valves and pumps to prevent or minimize the leakage of fluids through the mechanical clearances. Gaskets are generally installed in static clearances normally existing between parallel flanges or concentric cylinders. Dynamic packings are employed to fill mechanical clearances for moving surfaces.

In valves, rotary pumps, fans, compressors, and the like, the shaft projects through the casing in a zone known as the "stuffing box" or "packing box". These terms derive from the fact that in order to separate two environments, namely, that within the equipment and the atmosphere, and to prevent leakage of one environment into the other, some material had to be stuffed or packed around the shaft where it passed through its casing. For many years soft packing was the material that was most often employed for this purpose.

In operation, rotating shafts in the subject equipment can be displaced both radially and axially. Small inaccuracies resulting from machining, manufacturing and assembly produce radial displacement and differential thermal expansion causes axial displacement. To operate effectively, the sealing device must be flexible and compact enough to fit into the equipment.

A common type of rotating shaft seal consists of packing composed of fibers which are first woven, twisted, or braided into strands and then formed into coils, spirals, or rings. To ensure initial lubrication and to facilitate installation, the basic materials are often impregnated with various lubricants. Common materials are asbestos fabric, braided and twisted asbestos, rubber and duck, flax, jute, and metallic braids. So-called plastic packings can be made up with varying amounts of fiber combined with binder and lubricant for high-speed applications.

Packing may not provide a completely leak-free seal. With shaft surface speeds less than approximately 2.5 m/s (500 ft/min.), the packing may be adjusted to seal completely. However, for higher speeds some leakage is required for lubrication, friction reduction, and cooling.

Packing is usually in the form of a coil or spiral cut to form a closed or nearly closed ring in the stuffing box with clearance between the ends of the ring sufficient to allow for fitting and possible expansion due to swelling of the packing while in operation.

The type of the ring joint used in the packing depends on materials and service requirements. Braided and flexible metallic packings usually have butt or square joints. With other packing material, service rings cut with bevel or skive joints are more satisfactory, since the bevel permits a certain amount of sliding action, absorbing a portion of ring expansion.

In functioning, to retain fluid under pressure, dynamic packings carry the hydraulic load. When no pressure exists, as in many oil-seal applications, the packing is mechanically loaded as by a spring or by its own resiliency. Dynamic packings therefore operate as bearings, thus indicating the need for lubrication to serve as both a separating film and a coolant. While the presence of such a film is vital for satisfactory service life, it also means that leakage will occur.

Low-viscosity fluids and high pressures add to leakage problems, as both require thin films to minimize leakage. This causes higher friction and results in heat, which is the one most detrimental factor in packing life. Normally the fluid being sealed serves as the lubricant. Thus, where oils are involved, maximum efficiency is obtained. Next in order of desirability are clean water, solvents, and fluids, containing solids which progressively yield more unsatisfactory results unless supplemental lubrication is provided.

While various types of dynamic packings exist, soft or jamb packings are best suited for rod or plunger service, since an adjustable gland is required. Many materials are employed, such as braided flax saturated with wax or viscous lubricants for water and aqueous solutions; braided asbestos similarly treated or impregnated with polytetrafluoroethylene suspensoid for superior life under severe service conditions; laminated rubberized cotton fabric for hot water, low-pressure steam and ammonia; rolled rubberized asbestos fabric for steam; and rolled or twisted metal foil for high-temperature and high-pressure conditions. Packings containing woven or braided asbestos fibers are also made from wire-inserted yarns to gain additional strength.

Rotary shafts generally are packed with adjustable soft packings. The soft packings are of the same general type as those used for reciprocating service, with the asbestos braid lubricated with grease and graphite or with polytetrafluoroethylene suspensoid. The latter is the most popular for typical applications on centrifugal pumps and valve stems.

In hydrocarbon refineries, petrochemical plants, and in the exploration and production of oil and gas, there are valves, pumps, and other equipment which utilize soft packing as a sealing media. These soft packings, which are typically graphite or Teflon impregnated cord, have a limited service life and must be replaced often. Replacement of such packing requires that the equipment be taken off line. Further, removal of the packing is often a time consuming process, resulting in high maintenance costs, equipment downtime and lost profitability.

Graphitic packing, because of its many desirable features, is already very common in commercial/industrial valves and pumps throughout the world. A reliable, less damaging, packing removal tool would be very time and cost effective for these applications.

The problem has been that although from a sealing standpoint, graphitic valve/pump packing is superior to conventional asbestos fiber packing, its removal is significantly more difficult. Packing removal is a time consuming process in which the graphite rings are picked apart piece by piece. The severe damage imparted on the rings by conventional corkscrew type removal tools also causes small pieces of the graphite to be left in the stuffing box which require additional time to remove and tend to interfere with the installation of new packing.

Generally to remove the packing, a tool which may either resemble an ice-pick or a cork screw is used. The standard type of removal tool used for all current packings works much like a corkscrew which must be manually screwed into the seal ring and then pulled out. The intention of this approach is that some or all of the packing comes out with the tool. Most of the time this is not the case with graphitic packing. Even when more than one tool is used simultaneously, only small portions or bits and pieces of graphite are removed with each attempt. Packing tools of this type are also very easily broken as they are used at awkward angles to gain access to the stuffing box interior. In addition, because of their sharp tips, these tools are known to cause damage to stem/shafts and stuffing boxes, thus reducing the sealing ability.

While gaining access to the soft packing consumes a large portion of the time associated with packing replacement, the removal of the packing from the packing box itself is highly time consuming. Generally, to remove the packing a tool which may either resemble an ice-pick or a cork screw is used. U.S. Pat. No. 4,944,081 shows a typical cork screw type of soft packing removal tool. Such a tool is worked into the packing material and the packing picked out. As those skilled in the art recognize, this is a tedious exercise which is made all the more so by the fact that one cannot gain a firm hold of the packing material after inserting such a tool. Several attempts are often required because the packing material often slips off of the tool.

Therefore, what is needed is a packing removal tool of improved design which is capable of reducing the time required to remove soft packing from valves, pumps and other such equipment.

SUMMARY OF THE INVENTION

The present invention is directed to a tool for removing graphitic packing from valves and pumps that is more effective and efficient than current packing removal tools and allows removal of the seal rings in one piece. Use of the graphitic packing removal tool of the present invention enables graphitic packing to be removed more quickly and cost effectively. The packing is also removed more thoroughly from the stuffing box, thereby enhancing proper installation of the next packing set and promoting effective sealing. The tool is easily manufactured and is inexpensive.

The graphitic packing seal ring removal tool of the present invention is in the form of a cylindrical base ring with elongated leg shanks mounted axially along the circumferential center. To permit easier insertion around shafts, the graphic packing tool may be a two piece tool or have an axial slit. The base ring is approximately the size of the circumferential center of the packing seal ring, that is, the diameter of the base ring measured from its circumferential center, is approximately the same as the diameter of the packing seal ring measured from the circumferential center of the packing seal ring.

DETAILED DESCRIPTION OF THE INVENTION

The graphitic packing removal tool of the present invention allows the quick easy removal of graphic packing in one piece, unlike the tools of the prior art. A graphitic packing set usually consists of three or four flexible graphite seal rings encompassed by a graphite yarn end ring on the top and bottom of the stack. The end rings serve to prevent extrusion of the seal rings and wipe the stem surface of any graphite deposited by the seal rings. The removal of the upper yarn end ring by conventional methods generally is not a problem since it is located at the top of the packing stack in the stuffing box and is readily accessible. The problem is with the soft graphite seal rings deeper in the stuffing box. The graphite rings which are compressed during installation have a consistency such that they cannot be picked out or grabbed, except in small pieces.

Figure 1:
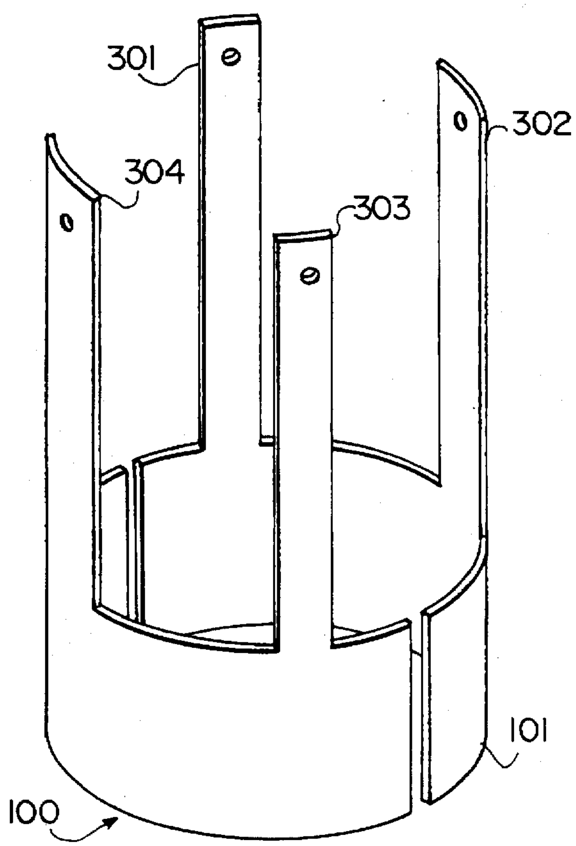
FIG. 1 shows a perspective view of one embodiment of the graphitic packing removal tool of the present invention in which the base ring has a rough surface finish and two placement slits.

The drawing figures show several different embodiments of the present invention. FIG. 1 shows one embodiment of the present invention in which graphitic packing removal tool 100 has a base ring 101 with a rough surface finish. All four leg shanks 301, 302, 303, and 304 are attached to the base ring 101, and are approximately 90-degrees apart.

The bottom edge of the base ring 101 of the packing removal tool 100 may be sharpened to allow easy packing ring penetration. Here-in-after reference to base ring 101 is understood to apply also to base ring 102, 103 and 104. To allow installation of the packing removal tool 100 around a shaft or a stem, the base ring may have a slit, as shown in base ring 102 FIG. 2, or may have two slits forming two pieces, as shown in FIG. 1. The single slit is positioned equidistant between any two leg shanks. The second slit is radially offset approximately 180-degrees from the first slit.

The base ring 101 of the graphic packing removal tool 100 is sized so it cuts down through the circumferential center of the packing ring, thus splitting the ring into two approximately concentric pieces to and causing the graphite to adhere to the inner and outer diameters of the removal tool. The penetration of the seal ring by the base ring 101 of the packing removal tool 100 causes a high load to be exerted upon the sides of the base ring, thus causing the graphite to cling to the base ring, so that it can be pulled out of the stuffing box in one piece. The rough surface finish of the base ring 101 further assists in the adhesion of the graphite to the base ring.

For maximum benefit, the base ring 101 of the packing removal tool 100 must be properly sized to the stuffing box in which it is used. The base ring 101 should be centered in the graphitic packing ring.

Figure 2:
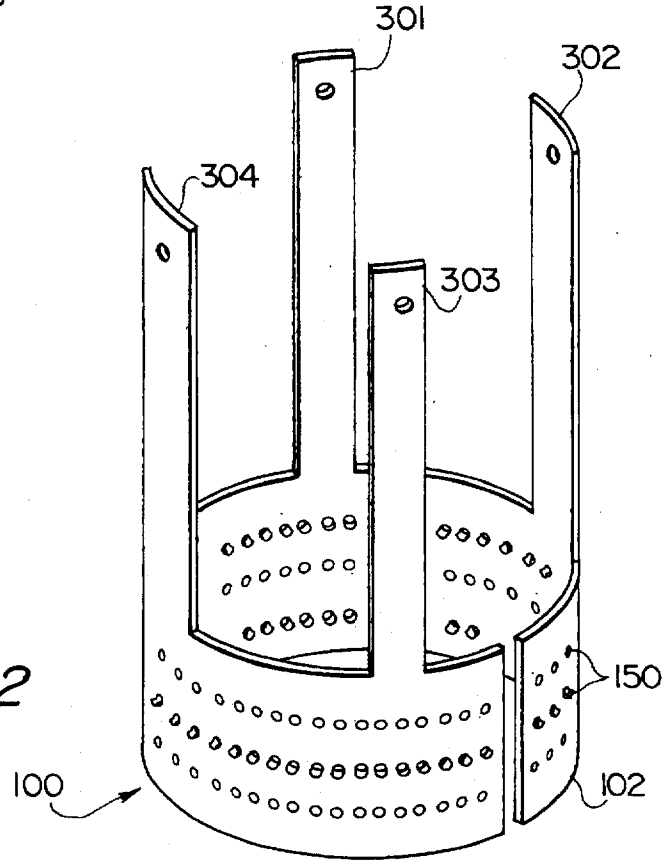
FIG. 2 shows a perspective view of another embodiment of the present invention in which the base ring contains perforations and one placement slit.

An alternative embodiment is shown in the graphitic packing removal tool 100 of FIG. 2 in which base ring 102 has perforations 150 punched into the sides creating protrusions that grip the packing ring during removal. Preferably the perforations 150 are vertically staggered to maximize the gripping area and to prevent any single deep groove from developing in the graphite during insertion of the base ring 102 of the packing removal tool 100. More preferably, the perforations 150 alternate so that one row around the circumference is bent outward away from the center of the ring and the next row is bent inward toward the center of the ring.

As the base ring 102 of packing removal tool 100 is inserted into the packing ring, the protrusions 150 easily penetrate the soft graphite rings. When the packing tool 100 is removed, the protrusions 150 dig into the graphite and hold the ring so it is removed in one piece along with the packing removal tool 100.

Figure 3:
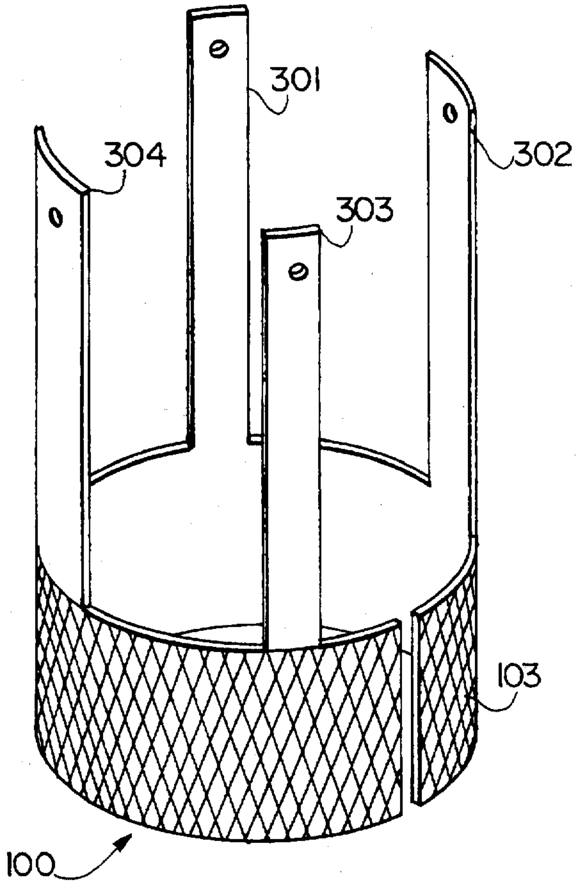
FIG. 3 shows a perspective view of a third embodiment of the present invention in which the base ring is knurled.

A further embodiment of the invention is depicted in FIG. 3 which shows a packing removal tool 100 with a base ring 103 containing knurling. The knurling operates in much the same manner as the rough surface finish shown in FIG. 1 and the perforations shown in FIG. 2.

Figure 4:
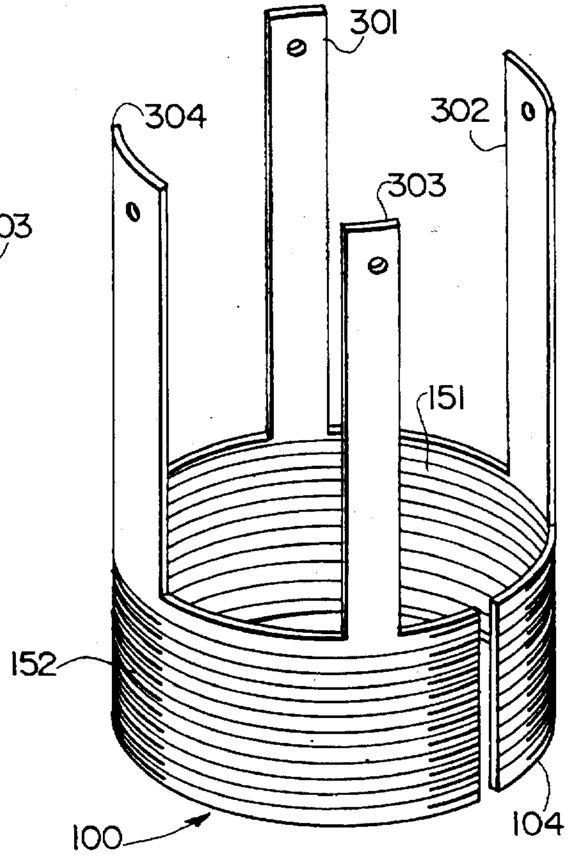
FIG. 4 shows a perspective view of a fourth embodiment of the present invention in which the base ring contains interior and exterior threads.

The different embodiment of the packing removal tool 100 is shown in FIG. 4. The packing removal tool 100 has a base ring 104 with an interrupted thread 151 on the inner circumference and an interrupted thread 152 on the outer circumference. Use of the packing removal tool 100 of FIG. 4 requires that the base ring 104 be threaded down into the material. This can be done using a spanner wrench attached to the removal tool follower 400 shown in FIG. 5.

Figure 5:
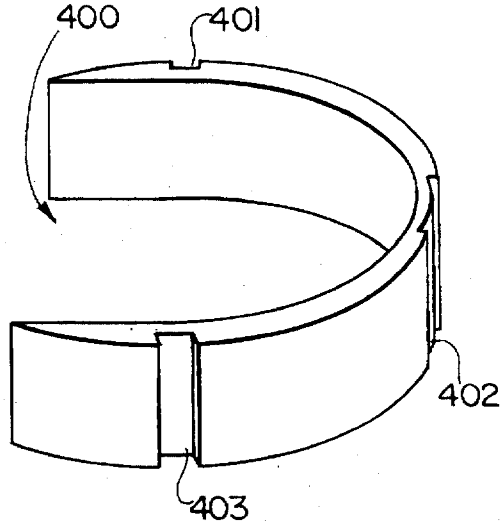
FIG. 5 shows a removal tool follower for use with all embodiments.

The removal tool follower 400 shown in FIG. 5 is generally shaped in a portion of a circle with slots 401, 402, and 403 that correspond to the elongated leg shafts 301, 302, and 303. The removal tool follower is placed so that each of the leg shafts 301, 302, and 303 are located in the respective slots 401, 402, and 403. This stabilizes the upper portion of the legs so that they can then be unscrewed using a spanner wrench or the like. The packing removal tool 100, with the sealing ring attached, is then pulled out vertically in a similar manner as the other tools.

The removal tool follower 400 can be used with all of the embodiments of the packing removal tool 100 and serves two purposes. Firstly, the removal tool follower 400 allows the packing removal tool 100 to be evenly compressed into the graphite. Secondly, the removal tool follower 400 centers the packing removal tool 100 so that it cannot touch, and thus damage, the stem or shaft and stuffing box walls.

In a further embodiment, the base ring is split into two pieces as shown in base ring 101 in FIG. 1, so that it can more readily be placed around a shaft or a stem.

To use the packing removal tool 100 of the present invention, as exemplified by FIGS. 1–4, the stuffing box is accessed. Before using the packing removal tool 100, the yarn end ring or rings on top of the packing seal rings should be taken out. The packing removal tool 100 is then centered on the top seal ring. When using the one piece packing removal tool 100, it is opened and inserted around the stem. The two-piece packing removal tool is used by centering both halves on the upper seal ring.

The removal tool follower 400 is then inserted into the stuffing box above the packing removal tool 100. The legs 301, 302, and 303 of the packing removal tool 100 are then placed in the respective slots 401, 402, and 403 of the removal tool follower 400. Use of the removal tool follower 400 allows the packing removal tool 100 to be evenly compressed into the graphite and it centers the packing removal tool 100, prohibiting it from touching and thus damaging the stem/shaft and stuffing box walls. The valve packing gland is then tightened down on the removal tool follower 400 much like adjusting the compression of the packing during installation. The depth of the packing removal tool 100 penetration into the packing stack is adjusted to remove one or more rings at a time. The packing gland is lifted out of the way and the packing removal tool legs 301, 302, 303, and 304 are pulled to remove the seal ring or rings along with the packing removal tool 100. This process is repeated until all of the seal rings are removed.

We claim:

1. A graphitic packing seal ring removal tool comprising:

(a) four elongated leg shanks mounted axially along a circumferential center of a cylindrical base-ring; and (b) said cylindrical base-ring having a diameter wherein said diameter is substantially equal to diameter of a circumferential center of a graphitic packing seal ring and said base-ring being penetrated by a first axial slit positioned equidistant between any two adjacent elongated leg shanks.

2. A graphitic packing seal ring removal tool as claimed in claim 1 wherein each individual leg shank is spaced 90-degrees apart from a next adjacent leg shank.

3. A graphitic packing seal ring removal tool as claimed in claim 2 wherein the base-ring has rows around its circumference of perforation holes punched normally through sidewalls of said base-ring creating protrusions, alternating one row bent outward and one row bent inward, that grip the graphitic packing seal ring during removal.

4. A graphitic packing seal ring removal tool as claimed in claim 2 wherein said base-ring has rows around its circumference of perforation holes punched normally through sidewalls of said base-ring creating protrusions, and wherein said perforation boles are staggered to maximize the gripping area and to prevent any single deep groove from developing in the graphitic packing seal ring during insertion of the tool.

5. A graphitic packing seal ring removal tool as claimed in claim 2 wherein sidewall surfaces of said base-ring further comprise a rough finish to grip the graphitic packing seal ring during removal.

6. A graphitic packing seal ring removal tool as claimed in claim 2 wherein sidewall surfaces of said base-ring further comprise a knurled finish to grip the graphitic packing seal ring during removal.

7. A graphitic packing seal ring removal tool as claimed in claim 2 wherein sidewall surfaces of said base-ring further comprise an interrupted thread along the inner and outer circumferences of said base-ring, for threading down into graphitic material to grid the packing seal ring during removal.

8. A graphitic packing seal ring removal tool as claimed in claim 1 wherein the base-ring is penetrated by a second axial slit, offset around a circumference of said base-ring 180 degrees from the first slit.

9. The graphitic packing seal ring removal tool of claim 1, further comprising a removal tool follower attached to the leg shanks of the removal tool to stabilize an upper portion of the removal tool during insertion and removal of the removal tool, said removal tool follower comprising:

(a) a circular portion having an outside diameter generally corresponding to a diameter of the graphitic packing seal ring removal tool; and (b) three slots located on an outside circumference corresponding to any three leg shanks mounted on the graphitic packing seal ring removal tool;

wherein said removal tool follower is used by placing the leg shanks from the graphitic packing seal ring removal tool in the slots in the removal tool follower stabilizing the upper portion of the removal tool.

10. A graphitic packing seal ring removal tool comprising:

(a) a cylindrical base-ring having a circumferential center, and having sidewalls with surfaces having means for gripping thereon;

(b) four elongated leg shanks mounted axially along said circumferential center and spaced 90-degrees apart from each other; and (c) a first vertical slit in said base-ring running axially from top to bottom of said base-ring, said slit positioned equidistant between any two adjacent leg shanks;

wherein said base-ring is sized in such a manner as to have approximately the same circumferential center as said packing seal ring, in order to cut down through a circumferential center of said seal ring.

11. The removal tool as claimed in claim 10 wherein said means for gripping is selected from the group comprising: a rough finish, a knurled finish, a circumferential interrupted thread along inner and outer sidewall surfaces, and perforation holes punched normally through said sidewalls, said holes having protrusions therefrom adapted to grip said packing seal ring during removal.

* * * * *